United States Patent
Longacre

(10) Patent No.: US 6,814,290 B2
(45) Date of Patent: Nov. 9, 2004

(54) METHOD FOR PROCESSING IMAGES CAPTURED WITH BAR CODE READER HAVING AREA IMAGE SENSOR

(75) Inventor: Andrew Longacre, Skaneateles, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 10/436,182

(22) Filed: May 12, 2003

(65) Prior Publication Data

US 2003/0197063 A1 Oct. 23, 2003

Related U.S. Application Data

(63) Continuation of application No. 09/615,505, filed on Jul. 13, 2000, now Pat. No. 6,575,367, which is a continuation-in-part of application No. 09/187,722, filed on Nov. 5, 1998, now Pat. No. 6,264,105.

(51) Int. Cl.$^7$ .................................................. G06K 7/10
(52) U.S. Cl. ............................... 235/462.1; 235/462.11; 235/462.08
(58) Field of Search ..................... 235/462.08, 462.1, 235/462.11

(56) References Cited

U.S. PATENT DOCUMENTS 6,575,367 B1 * 6/2003 Longacre, Jr. ......... 235/462.11

* cited by examiner

Primary Examiner—Karl D. Frech
(74) Attorney, Agent, or Firm—Wall Marjama & Bilinski LLP

(57) ABSTRACT

In the present invention, a bar code reader captures an initial image map corresponding to a scene, then subjects the initial image map to an interpolation step wherein values for constructed pixels positionally intermediate pixel values of the initial image map are interpolated as a function of the initial image map pixel values bordering the constructed pixels. After an interpolated image map is constructed, the interpolated image map is subjected to a binarization step wherein grey scale pixel values of the interpolated image map are converted into binary (1 or 0) pixel values by way of a thresholding process. In the thresholding process, grey scale pixel values are compared to a threshold in the grey scale range, then set to 1 if they are above the threshold and set to 0 if below the threshold. The pixel values of the resulting binarized interpolated image map are then analyzed to determine the identity of a message which may be encoded in any symbol which may be represented in the binarized interpolated image map.

36 Claims, 10 Drawing Sheets

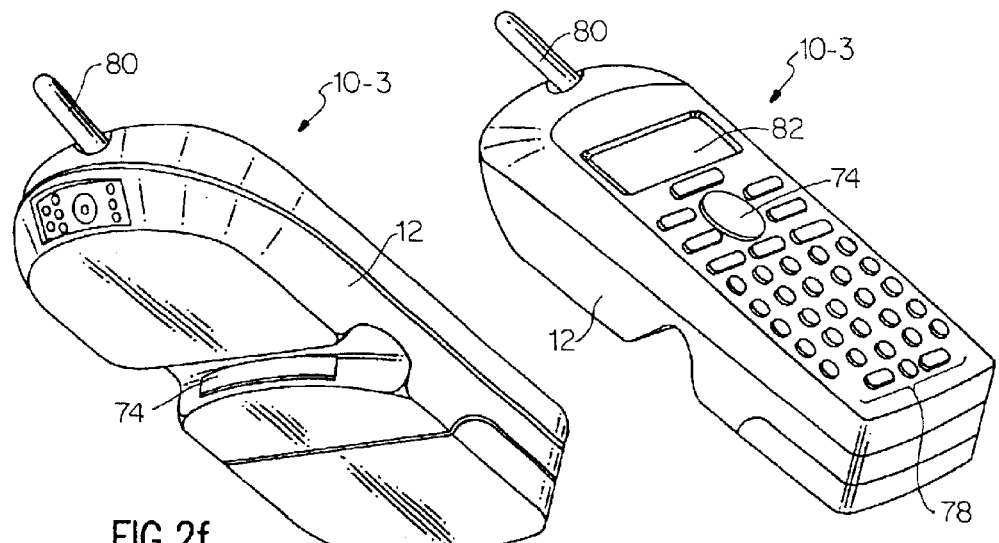
FIG.2f
FIG.2g
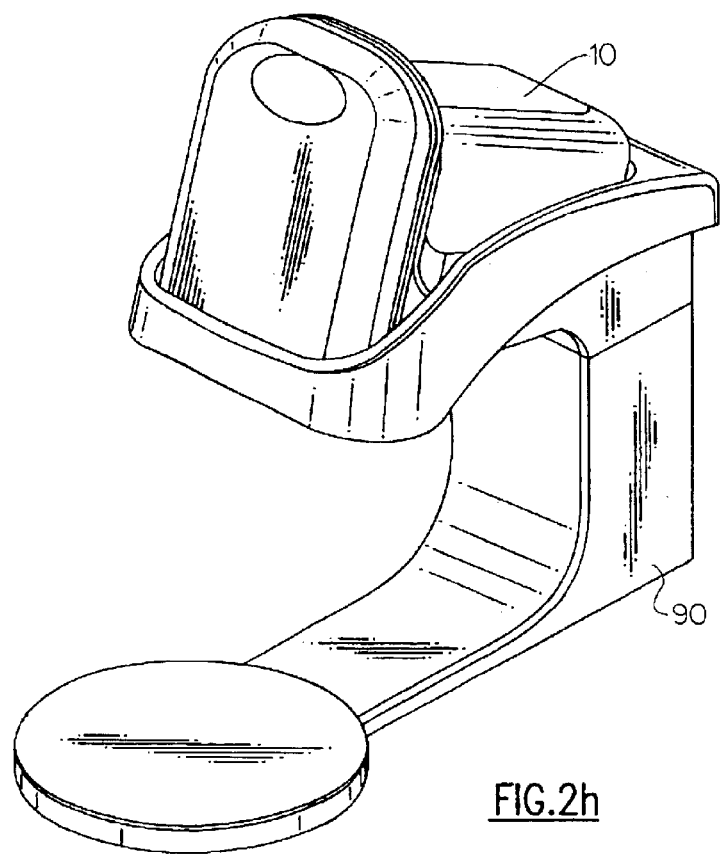
FIG.2h

| 100 P1 | 110 P2 | 115 P3 | 125 P4 |
|---|---|---|---|
| 105 P5 | 120 P6 | 125 P7 | 135 P8 |
| 115 P9 | 120 P10 | 130 P11 | 135 P12 |
| 125 P13 | 125 P14 | 130 P15 | 135 P16 |

| 100 P1 | 105 P1-2 | 110 P2 | 112.5 P2-3 | 115 P3 | 120 P3-4 | 125 P4 |
|---|---|---|---|---|---|---|
| 102.5 P1-5 | 108.8 P1-2-5-6 | 115 P2-6 | 117.5 P2-3-6-7 | 120 P3-7 | 125 | 130 P4-8 |
| 105 P5 | 112.5 P5-6 | 120 P6 | 122.5 P6-7 | 125 P7 | 130 P7-8 | 135 P8 |
| 110 P5-9 | 115 P5-6-9-10 | 120 P6-10 | 123.8 P6-7-10-11 | 127.5 P7-11 | 131.3 P7-8-11-12 | 135 P8-12 |
| 115 P9 | 117.5 P9-10 | 120 P10 | 125 P10-11 | 130 P11 | 132.5 P11-12 | 135 P12 |
| 120 P9-13 | 121.3 P9-10-13-14 | 122.5 P10-14 | 126.3 P10-11-14-15 | 130 P11-13 | 132.5 P11-12-15-16 | 135 P12-16 |
| 125 P13 | 125 P13-14 | 125 P14 | 127.5 P14-15 | 130 P15 | 132.5 P15-16 | 135 P16 |

| 0 | 0 | 0 | 1 |
|---|---|---|---|
| 0 | 1 | 1 | 1 |
| 0 | 1 | 1 | 1 |
| 1 | 1 | 1 | 1 |

BLACK/WHITE THRESHOLD = 120

| 0 | 0 | 0 | 0 | 0 | 1 | 1 |
|---|---|---|---|---|---|---|
| 0 | 0 | 0 | 0 | 1 | 1 | 1 |
| 0 | 0 | 1 | 1 | 1 | 1 | 1 |
| 0 | 0 | 1 | 1 | 1 | 1 | 1 |
| 0 | 0 | 1 | 1 | 1 | 1 | 1 |
| 1 | 1 | 1 | 1 | 1 | 1 | 1 |
| 1 | 1 | 1 | 1 | 1 | 1 | 1 |

BLACK/WHITE THRESHOLD = 120

FIG.9b

METHOD FOR PROCESSING IMAGES CAPTURED WITH BAR CODE READER HAVING AREA IMAGE SENSOR

This application is a continuation of application No. 09/615,505 filed Jul. 13, 2000 entitled "Image Data Binarization Methods Enabling Optical Reader to Read Fine Print Indicia," now U.S. Pat. No. 6,575,367, which is a continuation-in-part of application No. 09/187,722 filed Nov. 5, 1998 entitled "Bar Code Reader Configured to Read Fine Print Barcode Symbols," now U.S. Pat. No. 6,264,105. Both of the above patents are incorporated herein by reference.

FIELD OF THE INVENTION

This invention relates generally to optical readers in general and, in particular, to an optical reader configured to read fine print indicia.

BACKGROUND OF THE INVENTION

Bar code symbols are being employed in an ever-increasing number of applications, and the information requirements of such symbols are growing.

In recent years, there has been an increasing effort to encode large amounts of data into bar code symbols. New bar code symbol types, including 2D symbols such as stacked 1D and matrix symbols have become available which are specifically designed to increase the amount of data per area that can be encoded into a symbol.

In addition to utilizing new types of bar code symbols, users of bar code symbols have been printing such symbols in smaller sizes and in increasingly higher densities. The bar and space patterns of bar code symbols, whether 1D or 2D, are being printed and applied to items in increasingly finer prints.

The fine print of many bar code symbols in use today has resulted in an increase in the resolution requirements of optical reading devices which read such symbols. In the prior art, there has been suggested, in general, two approaches for addressing these increased resolution requirements.

The first approach suggested in the prior art for increasing reader resolution is to increase the pixel density of an image sensor used in an optical reader. This solution is highly effective performance-wise, but is also highly expensive. For purposes of illustrating the cost of increasing pixel density, a 1000 by 1000 pixel array sensor is currently approximately 8 times the cost of a 256 by 256 pixel array sensor. Incorporating a higher density pixel array into a reader also significantly increases data storage and data processing costs.

A second approach suggested by the prior art for increasing reader resolution is to adjust the reader optics so as to increase the magnification of captured scenes. This solution comes with the price of decreasing the area of the reader's field of view, however.

There is a need for a low cost high performance optical reader which is capable of reading fine print bar code symbols which are finding increased use.

SUMMARY OF THE INVENTION

According to its major aspects and broadly stated, the present invention is a method for decoding fine print bar code symbols. The method includes certain image data binarization steps which facilitate the reading of finer print symbols without requiring that the resolution of the reader be enhanced by altering hardware aspects of the reader.

In the present invention, a bar code reader captures an initial image map corresponding to a scene, then subjects the initial image map to an interpolation step wherein values for constructed pixels (pixels positionally intermediate pixels of the initial image map) are interpolated as a function of the initial image map pixel values bordering the constructed pixels.

After an interpolated image map is constructed, the interpolated image map is subjected to a binarization step wherein gray scale pixel values of the interpolated image map are converted into binary (1 or 0) pixel values by way of a thresholding process. In the thresholding process, gray scale pixel values are compared to a threshold (which may vary across the image) in the gray scale range, then set to 1 if they are above the threshold and set to 0 if below the threshold. Interpolating constructed pixel values before binarizing the interpolated image map decreases the amount of image information that would otherwise be lost by binarizing an initially captured image map image directly as in a prior art decoding method.

The pixels of an image map that are subjected to a high resolution binarization process in which constructed pixel values are interpolated from existing pixel values may be defined according to a "tile binarization" process. In a tile binarization process pixels of an image map are divided into a plurality of tiles, each comprising a predetermined number of pixels. Pixels of a given tile are subjected to binarization only when a pixel of the tile or a pixel in proximity with the tile is needed for analysis. In one embodiment of the invention, a reader binarizes tile pixels according to a low resolution binarization process when searching for decodable indicia in image data and binarizes tile pixels according to a high resolution binarization process when decoding decodable indicia which has been located.

These and other details, advantages and benefits of the present invention will become apparent from the detailed description of the preferred embodiment herein below.

BRIEF DESCRIPTION OF THE DRAWINGS

For a fuller understanding of the nature and objects of the invention, references should be made to the following detailed description of a preferred mode of practicing the invention, read in connection with the accompanying drawings, in which:

FIGS. 2b–2h illustrate various readers in which the invention may be incorporated.

FIG. 3 is a representation of an initial gray scale image map;

FIG. 4 is a representation of an interpolated image map interpolated from the image map shown in FIG. 2a;

FIG. 5 is a representation of a binarized image map binarized from the initial image map shown in FIG. 2a;

FIG. 6 is a representation of a binarized image map binarized from the interpolated image map shown in FIG. 3.

FIG. 7 is a representation of an initial image map including a region of interest which is selectively subjected to an interpolation step in accordance with the invention;

FIGS. 9a and 9b show image maps illustrating a "tile binarization" process which may be carried out according to the invention;

DETAILED DESCRIPTION OF THE PREFERRED EMBODIMENT

Figure 1:
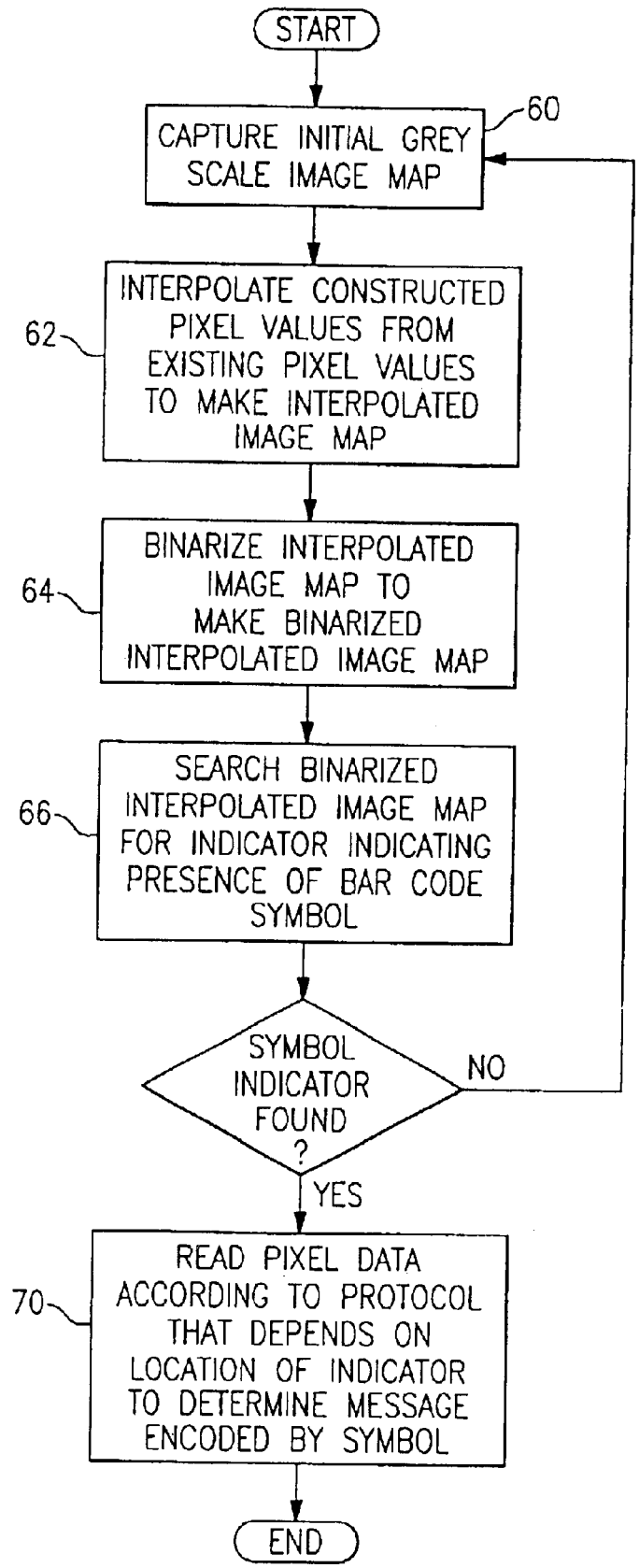
FIG. 1 is a flow diagram illustrating operation of a reader configured in accordance with the invention.
Figure 2A:
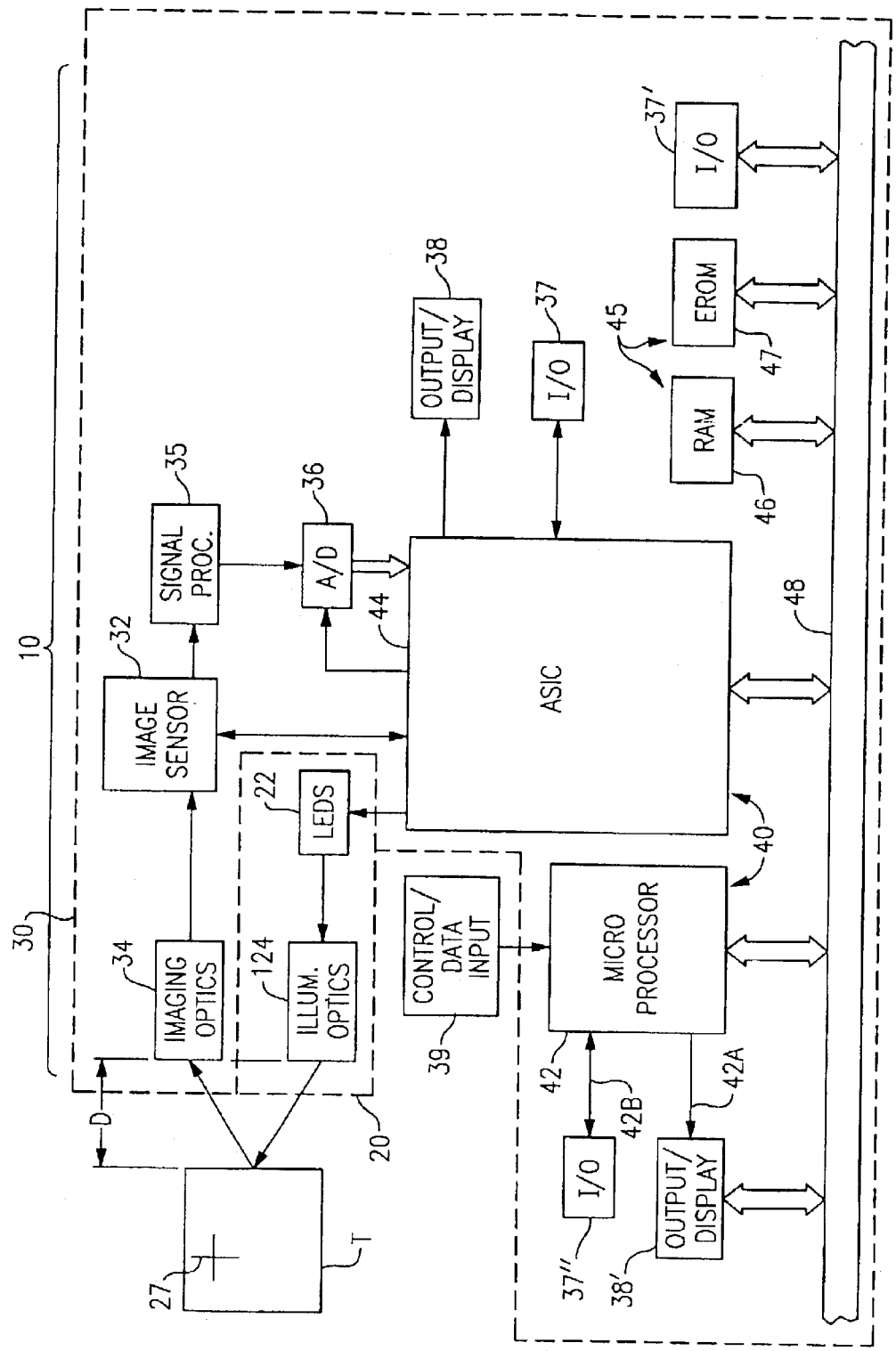
FIG. 2a is a block diagram of a bar code reader in which the invention may be incorporated.
Figures 2B, 2C:
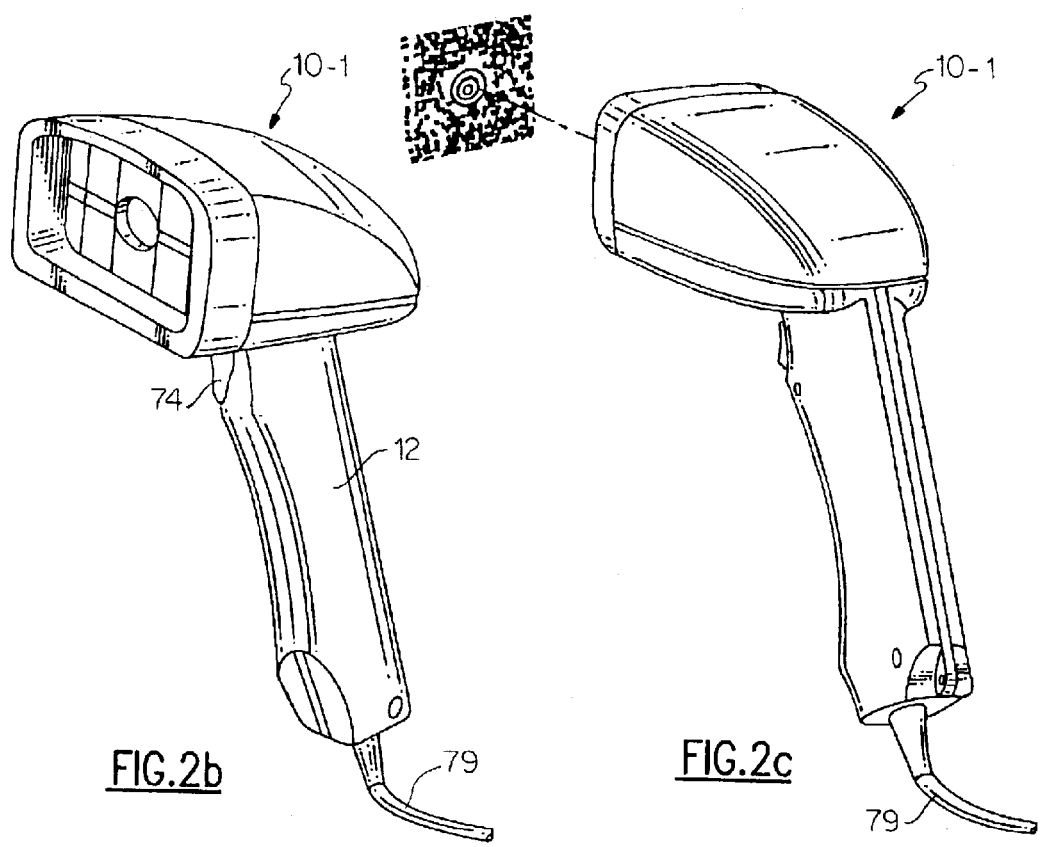
Figures 2D, 2E:
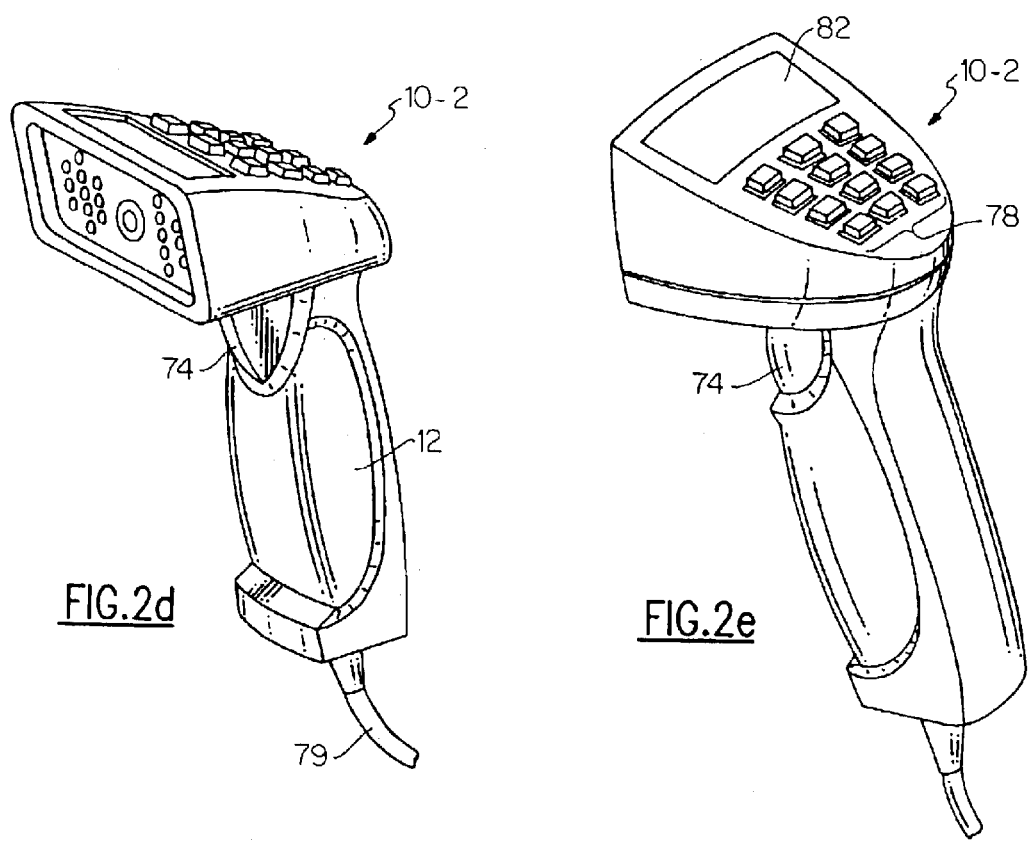

A flow diagram illustrating operation of a reader configured in accordance with the invention is shown in FIG. 1 while a block diagram of an optical reader of the type in which the present invention may be incorporated is shown in FIG. 2a.

Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of a target object T. Illumination assembly 20 may include target illumination and optics for projecting an aiming pattern 27 on target T. Illumination assembly 20 may be eliminated if ambient light levels are certain to be high enough to allow high quality images of object T to be taken. Imaging assembly 30 may include an image sensor 32, such as a 1D or 2D CCD, CMOS, NMOS, PMOS, CID OR CMD solid state image sensor, together with an imaging optics assembly 34 for receiving and focusing an image of object T onto image sensor 32. The array-based imaging assembly shown in FIG. 2a may be replaced by a laser array based imaging assembly comprising multiple laser sources, a scanning mechanism, emit and receive optics, at least one photodetector and accompanying signal processing circuitry.

Optical reader 10 of FIG. 2a also includes programmable control circuit 40 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as a read/write random access memory or RAM 46 and an erasable read only memory or EROM 47. RAM 46 typically includes at least one volatile memory device but may include one or more long term non-volatile memory devices. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding image data stored in RAM 46 in accordance with program data stored in EROM 47. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor, there between, is of any fundamental significance for purposes of the present invention.

With processor architectures of the type shown in FIG. 2a, a typical division of labor between processors 42 and 44 will be as follows. Processor 42 is preferably devoted primarily to such tasks as decoding image data, once such data has been stored in RAM 46, recognizing characters represented in stored image data according to an optical character recognition (OCR) scheme, handling menuing options and reprogramming functions, processing commands and data received from control/data input unit 39 which may comprise such elements as trigger 74 and keyboard 78 and providing overall system level coordination.

Processor 44 is preferably devoted primarily to controlling the image acquisition process, the A/D conversion process and the storage of image data, including the ability to access memories 46 and 47 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232, a network such as an, Ethernet, a serial bus such as USB, a wireless communication link (or other) compatible I/O interface 37. Processor 44 may also control the outputting of user perceptible data via an output device 38, such as a beeper, a good read LED and/or a display monitor which may be provided by a liquid crystal display such as display 82. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37' and 38'. As explained earlier, the specifics of this division of labor is of no significance to the present invention.

FIGS. 2b through 2g show examples of types of housings in which the present invention may be incorporated. FIGS. 2b–2g show 1D/2D optical readers 10-1, 10-2, 10-3. Housing 12 of each of the optical readers 10-1 through 10-3 is adapted to be graspable by a human hand and has incorporated therein at least one trigger switch 74 for activating image capture and decoding and/or image capture and character recognition operations. Readers 10-1 and 10-2 include hard-wired communication links 79 for communication with external devices such as other data collection devices or a host processor, while reader 10-3 includes an antenna 80 for providing wireless communication device or a host processor.

In addition to the above elements, readers 10-2 and 10-3 each include a display 82 for displaying information to a user and a keyboard 78 for enabling a user to input commands and data into the reader.

Any one of the readers described with reference to FIGS. 2b through 2g may be mounted in a stationary position as is illustrated in FIG. 2h showing a generic optical reader 10 docked in a scan stand 90. Scan stand 90 adapts portable optical reader 10 for presentation mode scanning. In a presentation mode, reader 10 is held in a stationary position and an indicia bearing article is moved across the field of view of reader 10.

As will become clear from the ensuing description, the invention need not be incorporated in a portable optical reader. The invention may also be incorporated, for example, in association with a control circuit for controlling a nonportable fixed mount imaging assembly that captures image data representing image information formed on articles transported by an assembly line, or manually transported across a checkout counter at a retail point of sale location.

Referring now to particular aspects of the invention, an exemplary embodiment of the invention is described with reference to the flow diagram of FIG. 1 and the pixel map diagrams shown in FIGS. 3–6.

Figures 3, 4:

In accordance with the invention, reader 10 at block 60 captures an initial gray scale bit map that is represented by the pixel map of FIG. 3. The term "capture" as used herein shall refer generally to a process involving processing analog signals from imaging assembly 30, converting these signals into digital form, presenting them to control circuit 40 and generating there from an initial image map representation or other memory-stored representation of the captured image.

The gray scale image map includes one word of data per pixel, each word normally having between 4 and 8 bits. Preferably each word contains 8 bits, and represents a gray scale pixel value of between 0 and 255, 0 representing absolute black and 255 representing absolute white. The dimension of the initial gray scale bit map corresponds to the pixel dimension of pixel array. Common dimensions for a pixel array are 494 by 659 pixels or 574 by 768 pixels, for example. A simplified 4×4 pixel map is shown in FIG. 3 for purposes of describing the invention.

In a prior art decoding scheme, the initial image map represented in FIG. 3 is subjected to a binarization process immediately after being captured. The image map is binarized by way of a thresholding process wherein each pixel value is compared to a threshold within the gray scale range. Each pixel value above the threshold is set to 1, while each pixel value below the threshold value is set to zero. A binarized representation of the image map of FIG. 3 binarized using a constant threshold of T=120 is shown in FIG. 5.

Figures 5, 6, 7:
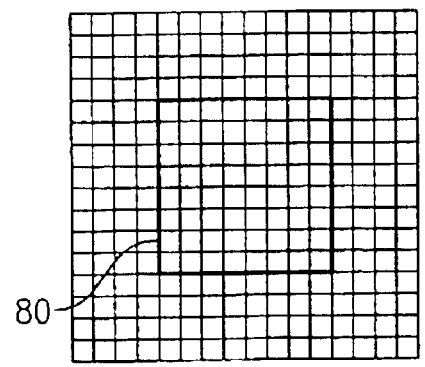

In the prior art decoding method, the next step in the decoding process is to analyze the binarized image map as represented by FIG. 5 to determine the information encoded by any bar code which may be contained in the pixel data. In a typical decoding algorithm, the analysis of the pixel data to determine the information encoded by any bar code includes the steps of (1) determining if an indicator (such as a bulls eye) is present indicating that a representative of a certain symbol contained a bar code certain symbology is contained in the image data, (2) reading captured pixel data according to a protocol that depends on a location of the indicator to determine the message encoded by a symbol. In the present invention, as illustrated by block 63 of the flow diagram of FIG. 1 control circuit 40 executes an intermediate interpolation step before binarizing gray scale pixel values. In an interpolation step, control circuit 40 interpolates pixel values for "constructed" pixels positionally intermediate of pixels in the initial image map.

An exemplary interpolated image map is shown in FIG. 4. The interpolated image map shown in FIG. 4 is developed from the initial image map shown in FIG. 3 by interpolating values for constructed pixels between the pixels of the initial image map. The value of each constructed pixel may be a function of the values of its bordering pixels. For example, $p_{1-2}$ may be a function of $p_1$ and $p_2$, and $p_{2-3}$ may be a function of $p_2$ and $p_3$ and so on. Center constructed pixel $p_{1-2-5-6}$ may be a function of pixels $p_1$, $p_2$, $p_5$ and $p_6$. In a typical embodiment, each constructed pixel is interpolated by averaging its neighboring pixels. It is seen that in the construction of the interpolated image map of FIG. 4 three constructed pixel values are interpolated for each one pixel of the original image map.

After constructing the interpolated image map at block 62, control circuit 40 at block 64 binarizes the interpolated image map. This binarization step may be carried out in the same manner that an initial image map is binarized as described previously in connection with FIGS. 2 and 4, that is, by a thresholding process wherein each pixel value in the image map is compared to a threshold and then set to 1 if above the threshold and to 0 if below the threshold. Interpolating the initial gray scale image map to create an interpolated image map before binarizing the image map reduces the amount of image information lost by binarizing gray scale image data.

Threshold values for use in binarizing gray scale image data may be developed utilizing a variety of different methodologies. Threshold values may be predetermined based on known illumination or exposure conditions. Threshold values may also be based on gray scale values of a threshold-determining frame of image data, which is typically the frame of image data being processed when the reader is of a type adapted for use in variable illumination conditions.

In calculating threshold values based on present or recently captured image data, control circuit 40 may consider every pixel of an image map. However, for increased processing speed, control circuit 40 may be adapted to sample a limited number of threshold-determining pixel values (such as 1/256 of pixels of the entire image map) at substantially evenly spaced apart pixel position for use in determining a similar number of threshold values for an image map. This set of gray scale values may be referred to as a sample array of threshold-determining values.

Preferably, the threshold value for use in binarizing a gray scale value at a given pixel position takes into consideration gray scale values of pixels of the threshold-determining frame in positional proximity to the given pixel position preferentially to gray scale values to pixel positions not in positional proximity with the given pixel.

Skilled artisans will recognize that numerous alternative methods are possible for ensuring that a threshold value at a given pixel position depends preferentially on pixel values of neighboring pixels. According to one method for developing threshold values that depend preferentially on the value of neighboring pixels, control circuit 40 may develop the threshold value at each pixel position of a threshold determining image map by calculating the average of the gray scale value at that pixel and of a predetermined arrangement of surrounding pixels. Likewise, control circuit 40 may develop a threshold value for a group of pixels corresponding to a given position in a sample array of threshold determining values by averaging the threshold determining value at the given position and threshold-determining values at positions surrounding the given position.

Figure 10A:
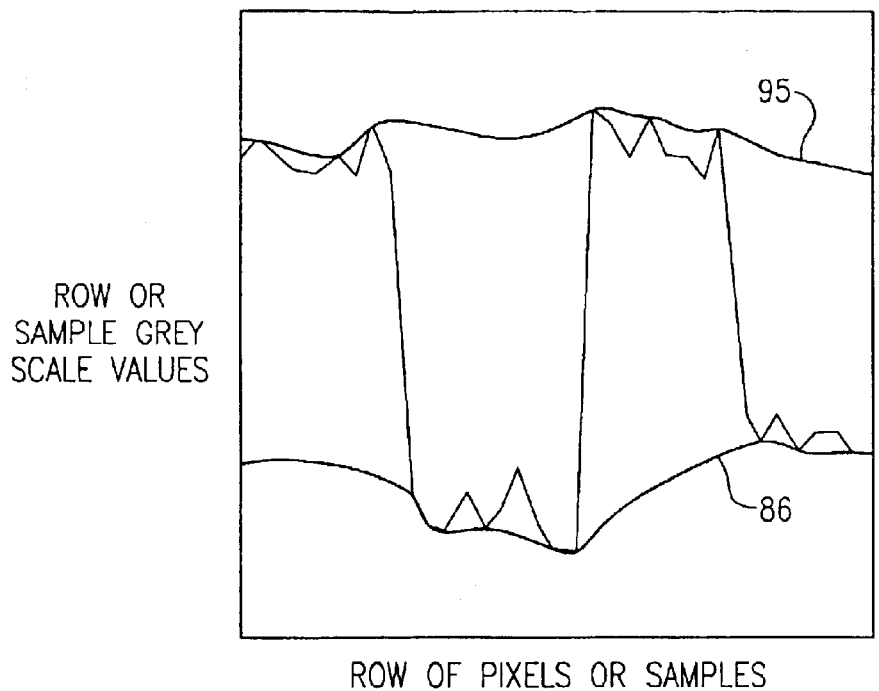
FIGS. 10a and 10b are diagrams illustrating a possible method for determining threshold values.
Figure 10B:
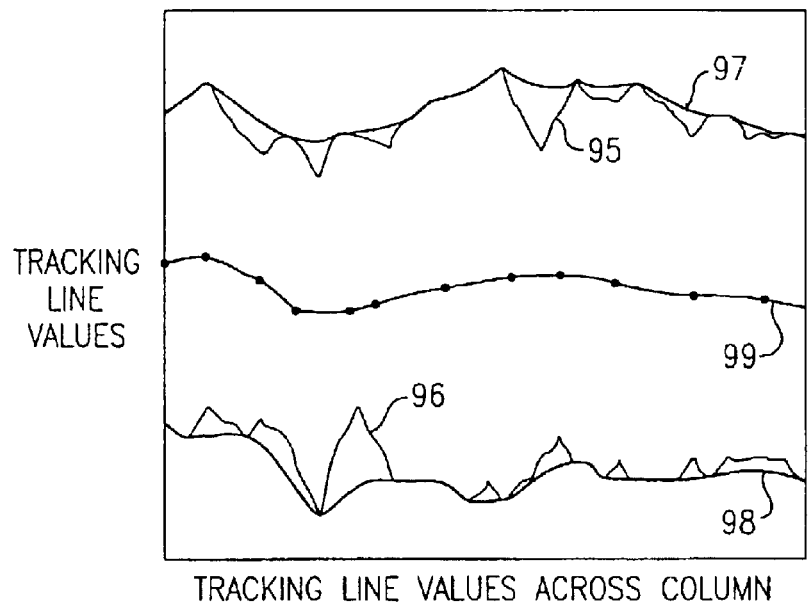

Another method for determining threshold values that depend preferentially on gray scale values of neighboring pixels is described with reference to FIGS. 10*a* and 10*b*. As illustrated in FIG. 10*a*, control circuit 40 may employ one of a variety of known mathematical algorithms to develop row maximum and minimum tracking lines 95 and 96 which track, respectively, local maxima and local minima gray scale values across a row of pixels, or a row of threshold-determining values in case threshold values for various pixel positions are being determined from a sample array of threshold determining values. As indicated in FIG. 10*a*, control circuit 40 may then analyze the row tracking line data to develop 2D maximum and minimum tracking lines 97 and 98 which track, respectively, changes in the row maximum tracking line data 95' and row minimum tracking line data 96' across each column of the pixel or sample array. Control circuit 40 may then develop for each column of a pixel or sample array a 2D threshold line 99 as the midpoint between the 2D maximum and minimum tracking lines 95 and 96 for use in determining threshold values at various pixel positions in the image map.

With reference again to FIG. 1, control circuit 40 at blocks 66 and 70 analyses the binarized interpolated image map generated at block 64 in order to determine the information represented in the binarized interpolated image map. As described previously in connection with FIG. 5, such analysis can include the steps of (1) determining if an indicator indicating the presence of a symbol of a certain symbology is present in the image data and (2) reading the pixel data according to a protocol that depends on the location of the indicator to determine the message encoded by a symbol.

Control circuit 40 can be programmed so that the control circuit 40 interpolates an entire initial image map prior to binarizing the bits of an interpolated image map. In an alternative embodiment of the invention, the control circuit 40 can be programmed to interpolate constructed pixel values for less than all pixel values of the image map. In one particular embodiment, control circuit 40 can be made to interpolate constructed pixel values only in predetermined areas of an image map.

A representation of an image map in which less than all pixels of an image map are interpolated is shown in FIG. 6. In this embodiment, constructed pixels are interpolated only from those pixels within a region of interest defined by boundary 80. Adapting the reader 10 to interpolate pixel values from less than all of the pixels in an initial image map reduces the time required to decode a symbol contained in a scene or to otherwise process the captured image information.

The invention can be adapted so that the region of interest defined by boundary 80 can be altered in response to user generated commands. In various alternative embodiments, the region of interest can be made larger or smaller, the shape of the region of interest can be changed, and the position of the region of interest can be moved in response to user generated commands.

The user generated commands which result in the region of interest being altered can be initiated by manual control inputs which may be provided on the reader itself or by control inputs of a peripheral device in communication with the reader. For example, the user generated commands may be initiated through use of a keyboard of a personal computer in communication with reader.

Figure 8:
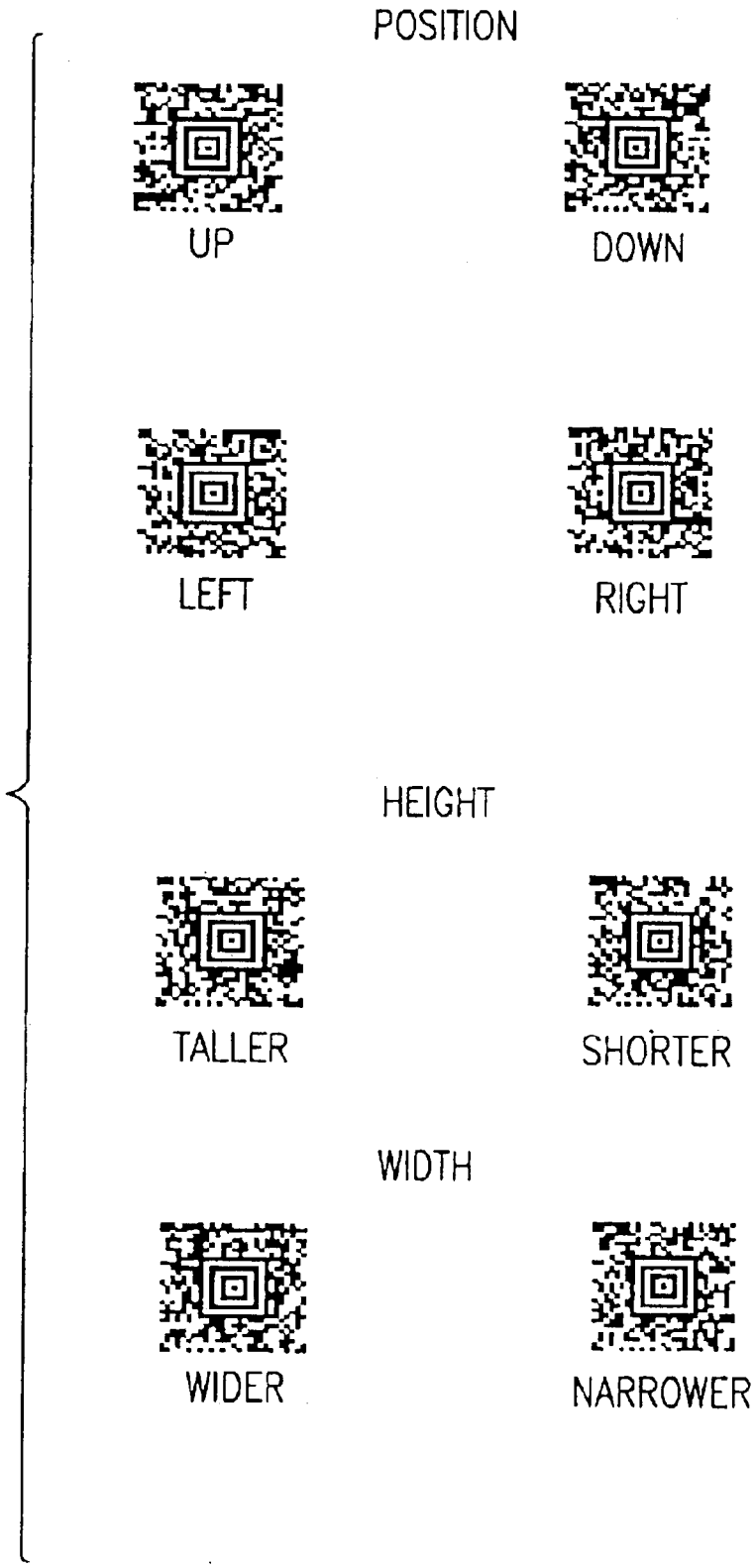
FIG. 8 shows an exemplary menu sheet which may be used to alter the position, shape, or size of a region of interest.

User generated commands resulting in altering of the size, shape and/or position of the region of interest can also be generated by reading of menu symbols, typically contained on a menu sheet as shown in FIG. 8. Menu symbols are symbols which when read and recognized by reader 10 result in the reader being reprogrammed in a certain way. Region of interest menu symbols as illustrated in FIG. 8 can be provided to result in the region of interest changing in position, shape, or size.

Changing the position, shape or size of a region of interest may be beneficial to the operation of the reader in a variety of operational situations. For example, it may be beneficial to change the position of boundary 80 as the reading depth of the reader changes. In some readers which include an aimer, such as aimer 23, an aimer projects an aiming pattern, such as pattern 27 centered at a point represented in pixels above a center pixel of a captured image when the reader is used to capture scenes at close range. When these readers are used to capture images at close range, it may be beneficial to adjust the position of boundary 80 upward in a pixel array so that the region of interest corresponds to an area of a scene highlighted by an aiming or spotter pattern.

In addition to making the size, shape, and/or position of a region of interest responsive to user generated commands, the size, shape and position of a region of interest can be made responsive to sensed features of a captured image.

For example, the size, the shape, and the position of a region of interest which is subjected to an interpolation step can be made responsive to features of a captured image which correspond to specific points of a bar code symbol. The decoding algorithm for decoding symbols of some symbologies begins with the step of locating a specific point of the symbol (typically a bulls eye) in captured image data. In one embodiment of the invention, the reader is configured so that the region of interest is a predetermined area of a pixel array about a pixel location corresponding to a bulls-eye of a symbol.

Bar code readers typically search for and locate bullseyes or other indicators of bar code symbols in binarized image data that has been binarized from an initial gray scale image map. Thus, readers that are configured to define a region of interest based on a location of a bullseye or another indicator of a symbol normally will be made to binarize an entire initial image map, determine the location of an indicator, define a region of interest based on the location of an indicator, and then interpolate constructed pixel values only within the region of interest.

Figure 9A:
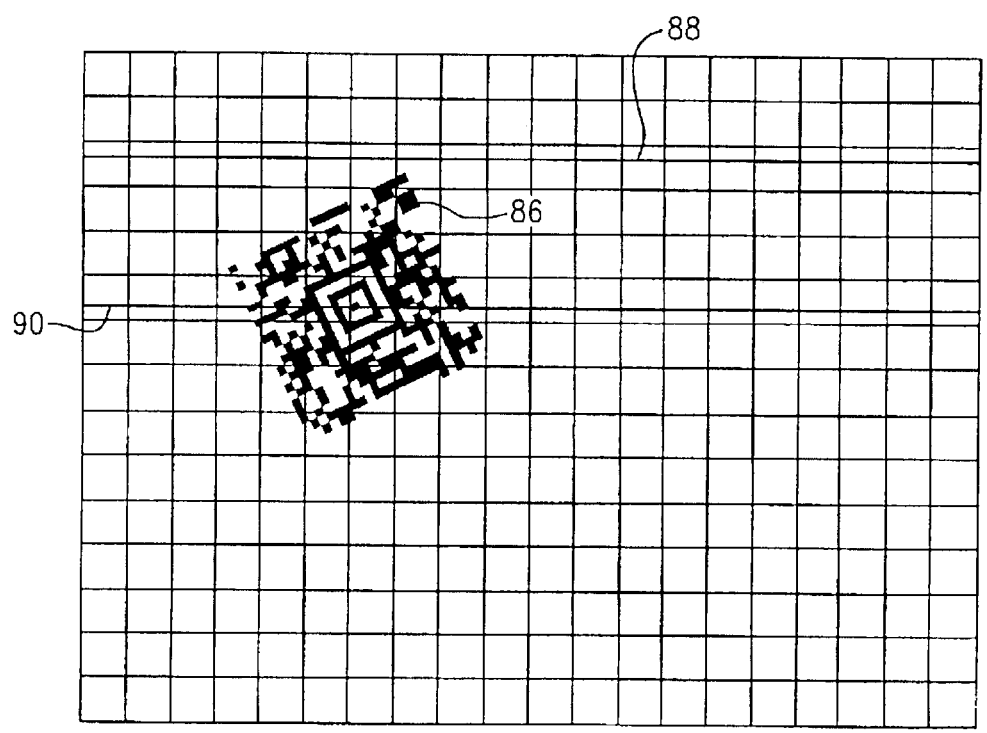
Figure 9B:
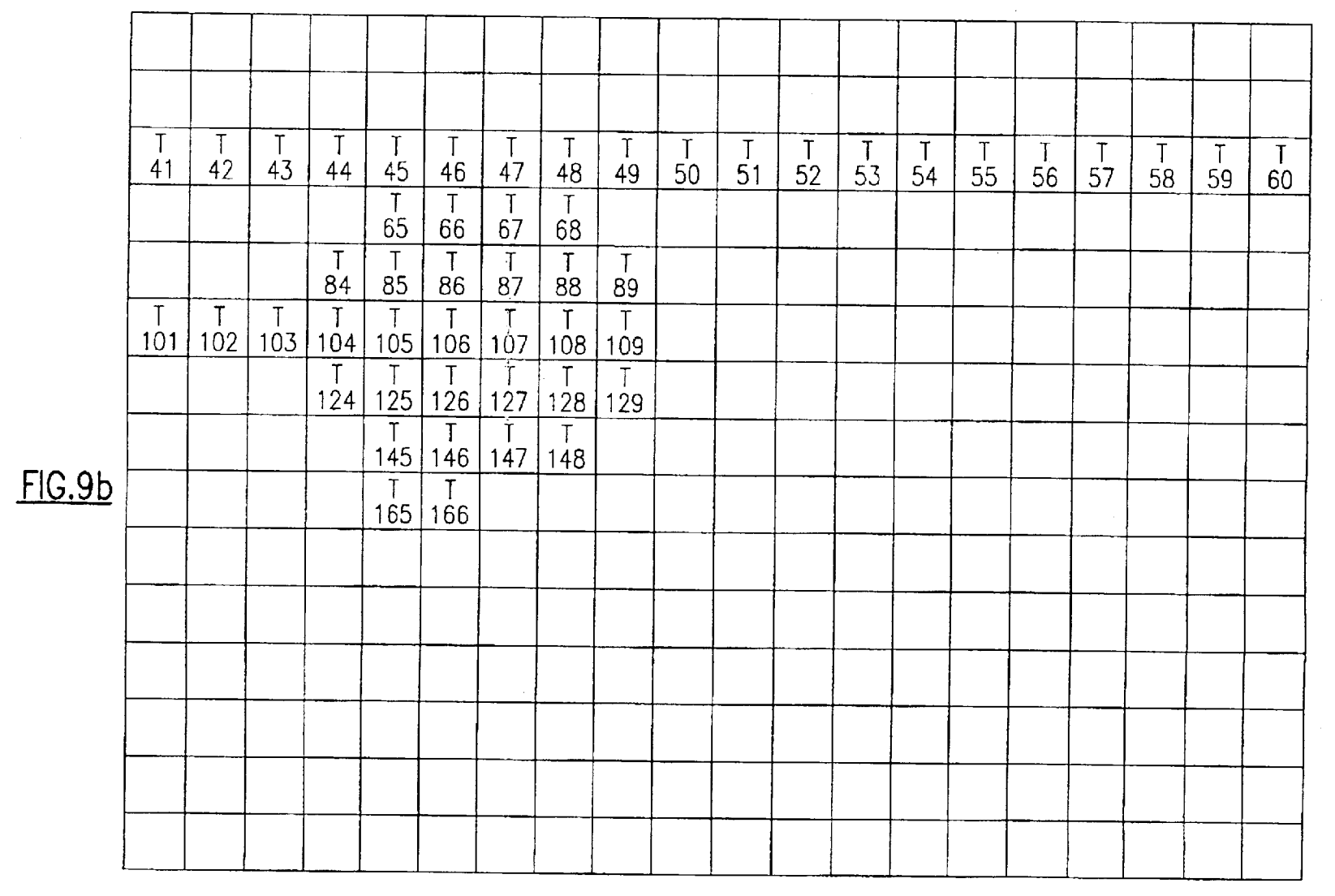

Region of interest pixels that are subjected to interpolation of constructed pixels values may be defined in accordance with a "tile binarization" process that is described with reference to FIGS. 9*a* and 9*b*. In a tile binarization process, control circuit 40 divides the initial image map into a predetermined number of "tiles" as are indicated in FIGS. 9*a* and 9*b*, each comprising a predetermined number of pixels. The tiles may be of any size and shape, and do not have to be similarly sized or shaped. It is convenient, however, to define each tile to be of equal size. Each tile may comprise an N×N such as a 32×32 pixel block, for example. The image map shown in FIGS. 9*a* and 9*b* has been divided into an array of 20×15=300 tiles, each of substantially equal size.

According to a tile binarization process, control circuit 40 subjects all of the pixels of a given tile to a particular binarization process only when a first pixel of the tile is needed, or is expected to become needed for analysis by control circuit 40.

With reference to FIGS. 9*a* and 9*b* it can be seen that a division of pixels of an image map into "tiles" may determine which pixels of an image map are to be processed by control circuit 40 as region of interest pixels subject to interpolation. According to a possible embodiment of the invention, control circuit 40 may capture an initial image map, subject the initial image map to a low resolution binarization process (wherein there is no interpolation of "constructed" pixel values) to develop a binarized bit map without deletion of the initial gray scale image map stored in memory 45. Control circuit 40 may then search the binarized image data for decodable indicia, locate a representation of a decodable indicia and, using the stored gray scale image map, subject only those pixels of the image map that are within tiles in which the decodable indicia is contained to the specialized "high resolution" binarization process described herein wherein constructed pixel values are interpolated from existing pixel values.

With reference to FIGS. 9a and 9b, a decodable symbol representation 86 is shown as being represented by pixels contained within tiles T47–48, T65–68, T84–T89, T104–109, T124–T129, T145–T148 and T164–T166. When executing a decoding algorithm for decoding symbol representation 86, control circuit 40 may be made to poll the position of each new pixel that is read during execution of the decoding algorithm to determine if the position corresponds to a tile that has not previously been subjected to high resolution binarization. If control circuit 40 determines that the position corresponds to a tile not previously subjected to high resolution binarization, control circuit 40 binarizes each pixel of the tile according to the high resolution binarization process described herein prior to proceeding with execution of the decoding algorithm. Control circuit 40 may also be made to binarize new tiles in accordance with a particular binarization process on the condition that control circuit 40 reads a pixel that neighbors a new tile (that is, on the condition the pixels of the tile are expected to become needed for analysis). For example, control circuit 40 may be made to subject all pixels of a new tile to a high resolution binarization process on the condition that control circuit 40 reads a pixel that borders the new tile in either side by side or diagonal relation.

In a variation of the invention, control circuit 40 may be configured to binarize image data of an image map on a tile-by-tile basis using a low resolution binarization process (without interpolating pixel values) when searching for decodable indicia and to binarize image data of an image map on a tile-by-tile basis using a high resolution binarization process (with interpolation of constructed pixel values) when performing decoding operations to decode a decodable indicia that has been located. It has been found that providing high resolution binarized image data normally improves the success rate and accuracy of decoding, but is normally not necessary to locate decodable indicia in image data.

Referring again to FIGS. 9a and 9b, control circuit 40, according to one common method for searching for decodable indicia, may launch scan lines 88 and 90 corresponding to predetermined pixel rows, then analyze the pixels of the rows to determine if an indicator of a symbol (such as a bullseye or other finder pattern) is represented within the launched scan line. In the example of FIGS. 9a and 9b, control circuit 40 may determine that an Aztec Code symbol is represented in the image data when analyzing pixels of scan line 90 within tile T108. When a symbol indicator is located, control circuit 40 may then launch a symbology specific decoding algorithm corresponding to the symbol indicator in order to attempt to decode the located symbol.

According to the invention, control circuit 40 in the example of 9a and 9b may be made to binarize pixels of tiles T41–T60 and tiles T101–T108 corresponding to scan lines 88 and 90 using a low resolution process when searching for decodable indicia such as symbol representation 86, and to binarize tiles T47–48, T65–68, T84–T89, T104–109, T124–T129, T145–T148 and T164–T166 corresponding to symbol representation 86 using a high resolution binarization process when executing steps of symbology specific decoding algorithm. It is seen in that the majority of tiles of the image map of FIGS. 9a and 9b are not subjected to any binarization. By causing control circuit 40 to binarize tiles only when pixels of a tile are needed, or are expected to become needed for analysis the tile binarization process enhances processing speed.

It is seen further in the above example that pixels of certain tiles such as tiles T47–T48 and T104–T108 will be subjected to both low resolution and high resolution binarization. If control circuit 40 may construct both low resolution and high resolution binarized image maps corresponding to the same position of a gray scale image map, then control circuit 40 may store both of these binary representations into memory 45 in a manner such that certain cells of the memory store bits corresponding to both of the low and high resolution binary representations. It is seen with reference again to FIGS. 3 and 4 that every other pixel of every other row of a high resolution interpolated image map, as shown in FIG. 4 is identical to a pixel value of the low resolution image map from which it has been interpolated, as shown in FIG. 3. In an embodiment of the invention featuring improved memory conservation and processing speed, control circuit 40 stores low resolution binary image data into memory cell locations allocated to contain a high resolution binary image, and "fills in" the missing bits of the high resolution image (such as bits corresponding to pixels P1–2, P2–3, P3–4, P1–5 . . . as shown in FIG. 4) if and when the region of the image is subjected to high resolution binarization. In such an embodiment, control circuit 40 is made to skip over memory space locations allocated to contain "constructed value" bits when processing low resolution binary image data (such as when searching for decodable indicia).

A reader according to the invention can also be made to define a region of interest based on features of image data of an initial gray scale image map (without any prior binarization of an initial image and searching for and locating features of image data in a full or partial binarized image map). For example, a reader according to the invention can be made to define a region of interest within an initial image map by measuring "energy" (the strength and number of transitions in an area of the image map) or another feature of the initial image map image data. Readers configured as such will decode bar code symbol, in general, by capturing an initial gray scale image map, detecting a feature of the initial image map, defining a region of interest within the initial image map based on the detected feature, interpolating constructed pixel values within the region of interest to form an interpolated image map, binarizing pixel values from the interpolated image map, and analyzing the binarized interpolated image map to determine a message encoded by a symbol.

In another embodiment of the invention, the reader can be configured so that the region of interest defined by boundary 80 expands if certain features of pixel data in a captured pixel array are sensed. In the example of FIG. 6, an initial region of interest is defined by boundary 80. If during the image data analysis process, it is determined that an entire symbol is contained within boundary 80, then the region of interest is not expanded. In an embodiment of the invention including the expandable region of interest feature, however, then the reader expands the region of interest if while analyzing image data, the reader determines that an entire symbol is not contained within a region of interest.

While the present invention has been explained with reference to the structure disclosed herein, it is not confined to the details set forth and this invention is intended to cover any modifications and changes as may come within the scope of the following claims:

What is claimed is:

1. A method for operating a bar code reader which captures a gray scale image map, said method including the step of:
   (A) detecting a feature of said gray scale image map;
   (B) defining a region of interest area about a detected feature detected in step (A);
   (C) interpolating constructed pixel values within said region of interest area to develop an interpolated image map; and
   (D) binarizing gray scale values of said interpolated image map to generate a binarized image map comprising binarized pixel values.

2. The method of claim 1, wherein said detecting step includes the step of measuring a strength and number of transitions in said gray scale image map.

3. The method of claim 1, wherein said method includes the step of utilizing a portable reader to capture said gray scale image map.

4. The method of claim 1, wherein said method includes the step of utilizing a stationary position reader to generate said gray scale image map.

5. A method for operating a bar code reader which captures a frame of image data, said method comprising the steps of:
   (A) programming said reader to operate in a low resolution binarization mode and in a high resolution binarization mode, wherein said reader, in said high resolution binarization mode interpolates constructed pixel values corresponding to constructed pixel locations intermediate original pixel locations;
   (B) utilizing said low resolution binarization mode when searching said frame of image data to determine if a decodable symbol is represented in said frame; and
   (C) driving said bar code reader into a high resolution binarization mode of operation if at step (B) a decodable symbol is determined to be represented in said frame.

6. The method of claim 5, wherein said utilizing step (B) includes the step of searching for a symbol indicator along a scan line.

7. The method of claim 5, wherein said driving step (C) includes the step of defining a region of interest about a position of said frame that includes a representation of a decodable symbol.

8. The method of claim 5, wherein said method includes the step of utilizing a portable reader to capture said frames of image data.

9. The method of claim 5, wherein said method includes the step of utilizing a stationary position reader to capture said frames of image data.

10. A method for operating a bar code reader having an image sensor said method including the steps of:
    (A) obtaining a sample or pixel array;
    (B) tracking local maxima of a row said array to generate row maximum tracking line data;
    (C) tracking local minima of said array to generate a row minimum tracking line data; and
    (D) utilizing said row maximum tracking line data and row minimum tracking line data to generate 2D maximum and minimum tracking lines which track, respectively, changes in said row maximum and row minimum tracking line data;
    (E) establishing a threshold tracking line between said 2D maximum and minimum tracking lines;
    (F) using said threshold tracking line to binarize pixel values in generating a binarized image map including binarized image data; and
    (G) searching for a symbol indicator in said binarized image map.

11. The method of claim 10, wherein said searching step (G) includes the step of analyzing a line of pixel values.

12. The method of claim 10, wherein said searching step (G) includes the step of searching for a representation of a symbol bullseye.

13. The method of claim 10, wherein said method includes the step of utilizing a portable reader to obtain said sample or pixel array obtained at step (A).

14. The method of claim 10, wherein said method includes the step of utilizing a stationary position reader to obtain said sample or pixel array obtained at step (A).

15. A method for operating a bar code reader of the type having an area image sensor, said method comprising the steps of:
    (A) capturing a gray scale image map;
    (B) binarizing pixel values of said gray scale image map to develop a binarized image map while saving said gray scale image map;
    (C) searching for a symbol indicator in said binarized image map; and
    (D) establishing a region of interest area about a location of located symbol indicator;
    (E) utilizing said gray scale image map, interpolating constructed pixel values from pixel values within said region of interest area to develop an interpolated image map; and
    (F) binarizing pixel values of said interpolated image map to generate a binarized image map corresponding to said region of interest area.

16. The method of claim 15, wherein said searching step (C) includes the step of searching for a representation of a symbol bullseye.

17. The method of claim 15, wherein said searching step (C) includes the step of launching a scan line.

18. The method of claim 15, further including the step of launching a symbology specific decoding algorithm to decode a decodable symbol represented in said binarized image map generated at step (F).

19. The method of claim 15, wherein said method includes the step of utilizing a portable reader to capture said gray scale image map captured at step (A).

20. The method of claim 15, wherein said method includes the step of utilizing a stationary position reader to capture said gray scale image map captured at step (A).

21. A method for operating an area image sensor bar code reader which captures an image map, said method comprising the steps of:
    (A) configuring said reader so that when searching for a symbol indicator in said image map, said reader searches for a symbol indicator within an adjustable region of interest area of said image map which may be adjusted in response to a user input command to adjust at least one of a position, size, or shape of said region of interest area; and
    (B) manually inputting a user-input command to said reader to adjust at least one of a position, size or shape of said region of interest area.

22. The method of claim 21, wherein said manually inputting step includes the step of reading a menu symbol.

23. The method of claim 21, wherein said manually inputting step includes the step of actuating a keyboard of a host computer in communication with said reader.

24. The method of claim 21, wherein said method includes the step of inputting said user-input command to adjust said region of interest area when a reading depth of said reader is changed.

25. The method of claim 21, wherein said configuring step includes the step of configuring said reader so that a size of said region of interest area is manually adjustable, and wherein said inputting step includes the step of manually inputting a user-input command to adjust a size of said region of interest area.

26. The method of claim 21, wherein said configuring step includes the step of establishing said region of interest to be a rectangular shaped subset of a full frame image map.

27. A method for operating an area image sensor bar code reader which captures an image map, said method comprising the steps of:

(A) configuring said reader so that when searching for a symbol indicator in said image map, said reader searches for a symbol indicator within an adjustable region of interest of said image map; and (B) adjusting at least one of a position, size or shape of said region of interest area in response to a change in a reader depth of said reader.

28. The method of claim 27, wherein said adjusting step (B) is executed in response to a receipt by said reader of a manually input user-input command to change at least one of a size, position, or shape of said region of interest.

29. The method of claim 27, wherein said adjusting step (B) includes the step of adjusting a size of said region of interest area.

30. A method of operating a bar code reader which captures frames of image data, said method comprising the steps of:

(A) defining a region of interest area in an initially captured frame of image data, said initially captured frame of image data including an M×N array of pixel values, said region of interest area including a subset of said M×N array of pixel values;

(B) searching for a decodable symbol representation within said region of interest area;

(C) maintaining an original dimension of said region of interest area if in said searching step (B) a decodable symbol representation is determined to be positioned entirely within said region of interest area; and (D) automatically expanding a dimension of said region of interest area if at step (B) it is determined that an entire decodable symbol representation is not located within said region of interest area.

31. The method of claim 27, further comprising the step of interpolating constructed pixel values from pixel values within said region of interest area.

32. The method of claim 27, wherein said method includes the step of utilizing a portable reader to capture said frames of image data.

33. The method of claim 27, wherein said method includes the step of utilizing a stationary position reader to capture said frames of image data.

34. The method of claim 1, wherein said searching step (B) includes the step of searching for a representation of a complete bar code symbol in said region of interest.

35. The method of claim 1, wherein said defining step (A) includes the step of defining said region of interest to be a rectangular arrangement of pixel positions in said M×N array of pixel values.

36. The method of claim 1, wherein said defining step (A) includes the step of defining a region of interest area at a center of said initially captured frame of image data.

* * * * *

UNITED STATES PATENT AND TRADEMARK OFFICE
CERTIFICATE OF CORRECTION

PATENT NO. : 6,814,290 B2  Page 1 of 1
APPLICATION NO. : 10/436182
DATED : November 9, 2004
INVENTOR(S) : Longacre It is certified that error appears in the above-identified patent and that said Letters Patent is hereby corrected as shown below:

On the title page item (54) and Col. 1, line 1, should read:

(54) METHOD FOR PROCESSING IMAGES CAPTURED WITH BAR CODE READER HAVING IMAGE SENSOR

Signed and Sealed this

Fifth Day of August, 2008

JON W. DUDAS
*Director of the United States Patent and Trademark Office*